(12) United States Patent
Kim et al.

(10) Patent No.: US 8,768,308 B2
(45) Date of Patent: Jul. 1, 2014

(54) APPARATUS AND METHOD FOR CREATING AND MANAGING PERSONAL SCHEDULES VIA CONTEXT-SENSING AND ACTUATION

(75) Inventors: Kyu-Han Kim, Redwood City, CA (US); Nischal Piratla, Fremont, CA (US)

(73) Assignee: Deutsche Telekom AG, Bonn (DE)

( * ) Notice: Subject to any disclaimer, the term of this patent is extended or adjusted under 35 U.S.C. 154(b) by 515 days.

(21) Appl. No.: 12/569,565

(22) Filed: Sep. 29, 2009

(65) Prior Publication Data

US 2011/0076994 A1   Mar. 31, 2011

(51) Int. Cl.
*H04M 1/663* (2006.01)
*H04M 1/725* (2006.01)

(52) U.S. Cl.
USPC .......... 455/412.2; 455/412.1; 455/414.1; 455/414.2; 455/414.3; 455/414.4; 455/418; 455/466; 715/751; 715/752; 715/963; 709/202; 709/203; 709/204; 709/205; 709/206; 379/88.08; 379/88.09; 379/88.11; 379/88.12; 379/88.13; 379/88.14; 379/88.22; 379/88.23; 379/88.28

(58) Field of Classification Search
USPC .......... 455/412.1, 414.1, 414.2, 414.3, 414.4, 455/418, 466; 709/202–206; 379/88.08, 379/88.09, 88.11, 88.12, 88.13, 88.14, 379/88.22, 88.23, 88.28; 715/751, 752, 963
See application file for complete search history.

(56) References Cited

U.S. PATENT DOCUMENTS

| | | | |
|---|---|---|---|
| 5,960,326 A * | 9/1999 | Kido | 340/7.1 |
| 6,038,542 A | 3/2000 | Ruckdashed | |
| 7,174,366 B2 | 2/2007 | Chou | |
| 7,479,900 B2 | 1/2009 | Horstemeyer | |
| 7,584,253 B2 * | 9/2009 | Curbow et al. | 709/206 |
| 7,711,782 B2 * | 5/2010 | Kim et al. | 709/206 |
| 8,190,130 B2 * | 5/2012 | Dillon | 455/412.2 |
| 8,457,669 B2 * | 6/2013 | Hardy et al. | 455/466 |
| 8,620,273 B2 * | 12/2013 | Maguire et al. | 455/414.1 |
| 2001/0051935 A1 | 12/2001 | Sugiura | |
| 2003/0026392 A1 * | 2/2003 | Brown et al. | 379/88.13 |
| 2004/0066924 A1 | 4/2004 | Wertsberger | |
| 2004/0249693 A1 | 12/2004 | Sako | |
| 2004/0259536 A1 | 12/2004 | Keskar et al. | |
| 2004/0267600 A1 * | 12/2004 | Horvitz | 705/10 |

(Continued)

FOREIGN PATENT DOCUMENTS

EP   2 091 010 A1   2/2001
WO   WO 01/09755 A2   2/2001

OTHER PUBLICATIONS

Horvitz Eric et al, XP007905000, "Attention-Sensitive Alerting", Uncertainty in Artificial Intelligence. Proceedings of the Conferenc, Stockholm, Jul. 1999, Jul. 1, 1999.

(Continued)

*Primary Examiner* — Olumide T Ajibade Akonai
(74) *Attorney, Agent, or Firm* — Leydig, Voit & Mayer, Ltd.

(57) ABSTRACT

An apparatus and method for schedule management includes storing at least one schedule for a user. The current activity of the user is determined. At a remind time for each schedule, the user is reminded of the schedule according to a reminder method. The reminder method selection is based on at least the determined current activity of the user. Some of the reminder methods selected between may include, for example, voice, ring, vibration, light, and/or text.

8 Claims, 10 Drawing Sheets

(56) References Cited

U.S. PATENT DOCUMENTS

| | | |
|---|---|---|
| 2005/0227712 A1 | 10/2005 | Estevez et al. |
| 2005/0267770 A1 | 12/2005 | Banavar et al. |
| 2006/0136280 A1 | 6/2006 | Cho et al. |
| 2006/0155465 A1* | 7/2006 | Jung et al. .................... 701/209 |
| 2006/0218029 A1 | 9/2006 | Chin |
| 2007/0073810 A1* | 3/2007 | Adams et al. ................ 709/205 |
| 2007/0118415 A1* | 5/2007 | Chen et al. ....................... 705/8 |
| 2008/0045173 A1 | 2/2008 | Park et al. |
| 2009/0068990 A1* | 3/2009 | Kim et al. .................. 455/412.1 |
| 2009/0106036 A1* | 4/2009 | Tamura et al. .................... 705/1 |
| 2010/0075648 A1* | 3/2010 | Matsuoka et al. ............ 455/418 |
| 2010/0111071 A1* | 5/2010 | Khare ........................... 370/352 |
| 2011/0004496 A1* | 1/2011 | Erb ................................... 705/5 |

OTHER PUBLICATIONS

European Search Report from European Patent Application No. 10010769.7, mailed on Feb. 2, 2011.

* cited by examiner

APPARATUS AND METHOD FOR CREATING AND MANAGING PERSONAL SCHEDULES VIA CONTEXT-SENSING AND ACTUATION

TECHNICAL FIELD

The present invention relates generally to telecommunications and in particular but not exclusively, to an apparatus, method, and manufacture for personal schedule management that makes use of a user's context information obtained by a sensor-rich mobile phone.

BACKGROUND

Personal schedule management systems are widely used due to the pervasive use of laptop or mobile computing systems. The use of such a management system is one of the essential tools for managing a person's schedule in business as well as personal environments. Further, the system closely interacts with a user on a daily basis.

The following is a usual scenario where a user interacts with a schedule management system:
1) A user receives a meeting request from his/her colleague via an email or call.
2) A user types in his/her meeting schedule information (e.g., time, date, venue, and attendee(s)) into the system.
3) A user then receives a sound or text alert for the schedule from the system, about the approaching meeting with further details.
4) Usually, a user pushes a button of the system for either "dismiss" or "snooze," and takes action for the schedule.
5) Or, if a user cannot make the schedule, he/she will cancel the meeting by call and/or manually send a reschedule request message to the organizer of the meeting and/or attendee(s).

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, certain embodiments of the invention are related to an apparatus and method for schedule management including storing at least one schedule for a user. The current activity of the user is determined. At a remind time for each schedule, the user is reminded of the schedule according to a reminder method. The reminder method selection is based on at least the determined current activity of the user. Some of the reminder methods selected between may include, for example, voice, ring, vibration, light, and/or text.

Illustrative Operating Environment

Figure 1:
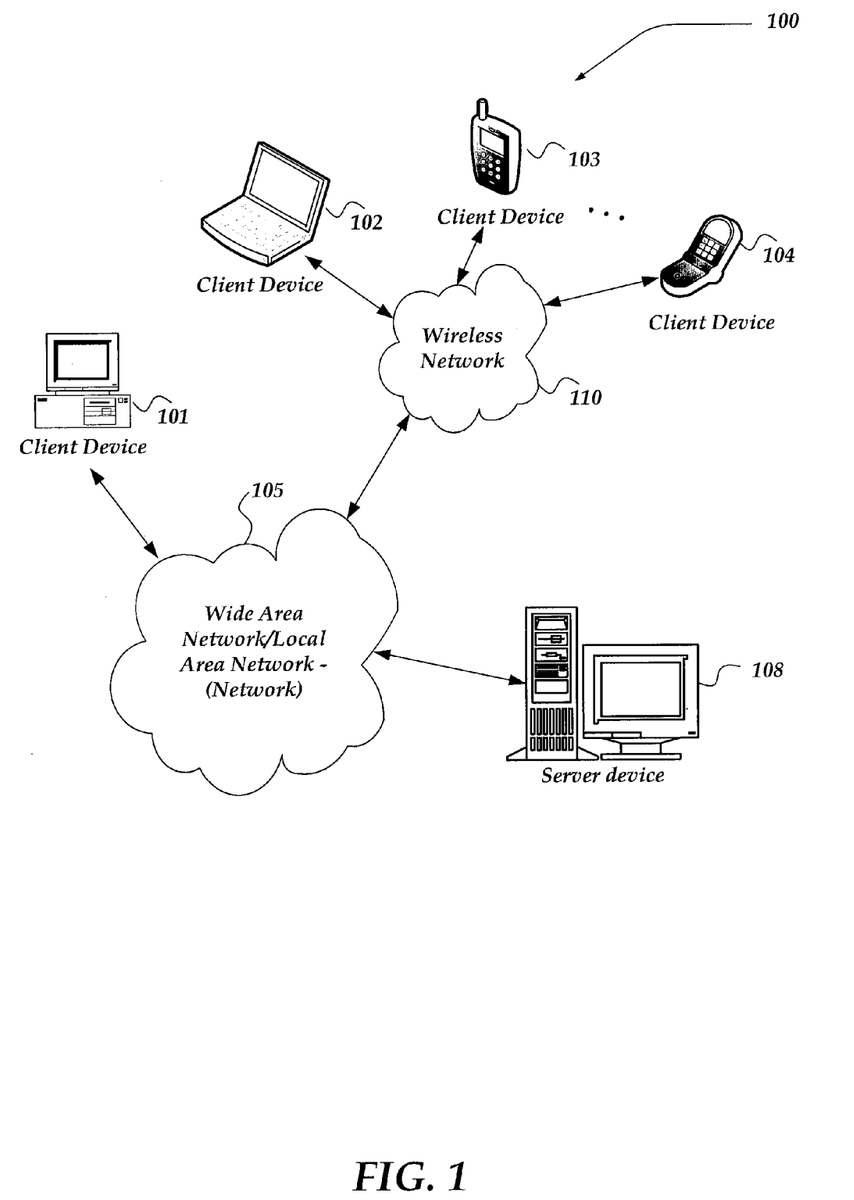
FIG. 1 shows a block diagram of an embodiment of a system for communicating over a network.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, client devices 101-104, and server device 108.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

In one embodiment, client devices 101-104 may further provide information useable to detect a location of the client device. Such information may be provided in a message, or sent as a separate message to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device. Information provided either as part of a user account generation, a purchase, or other activity may result in providing various customer profile information. Such customer profile information may include, but is not limited to demographic information about a customer, and/or behavioral information about a customer and/or activities. In one embodiment, such customer profile information might be obtained through interactions of the customer with a brick-and-mortar service, or dynamically tracked based on a usage of the telecommunication carrier's products/services. However, customer profile information might also be obtained by monitoring activities such as purchase activities, network usage activities, or the like, over a network.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple server device 108 and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Devices that may operate as server device 108 include, but are not limited to personal computers, desktop computers, multiprocessor systems, microprocessor-based or programmable consumer electronics, network PCs, servers, network appliances, and the like.

Although server device 108 is illustrated as a distinct network device, a plurality of network devices may be configured to perform the operational aspects of server device 108.

Illustrative Client Environment

Figure 2:
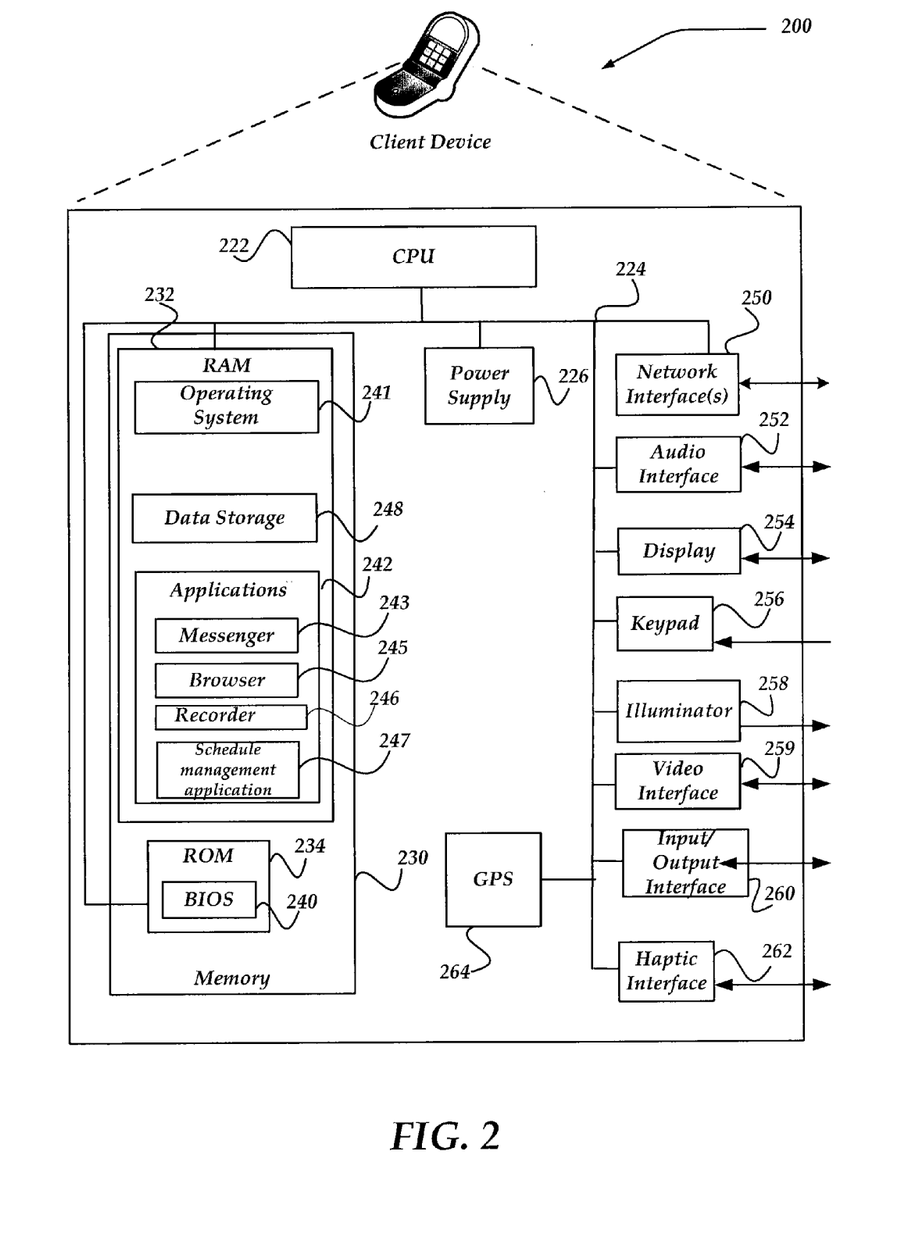
FIG. 2 illustrates a block diagram of an embodiment of a client device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light. In one embodiment, video interface 259 may interact with recorder 246 application to manage such actions.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VoIP applications, contact managers, task managers, transcoders, database programs, word processing programs, security applications, spreadsheet programs, games, search programs, voice-to-text conversion software, voice recognition software, caller ID applications, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), Hyper- Text Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Applications 242 may include schedule management application 247. In some embodiments, schedule management application 247 may include processor-executable code to perform at least one of the methods illustrated in FIG. 4, FIG. 6, FIG. 7, FIG. 8, FIG. 9, and/or FIG. 10.

Illustrative Network Device Environment

Figure 3:
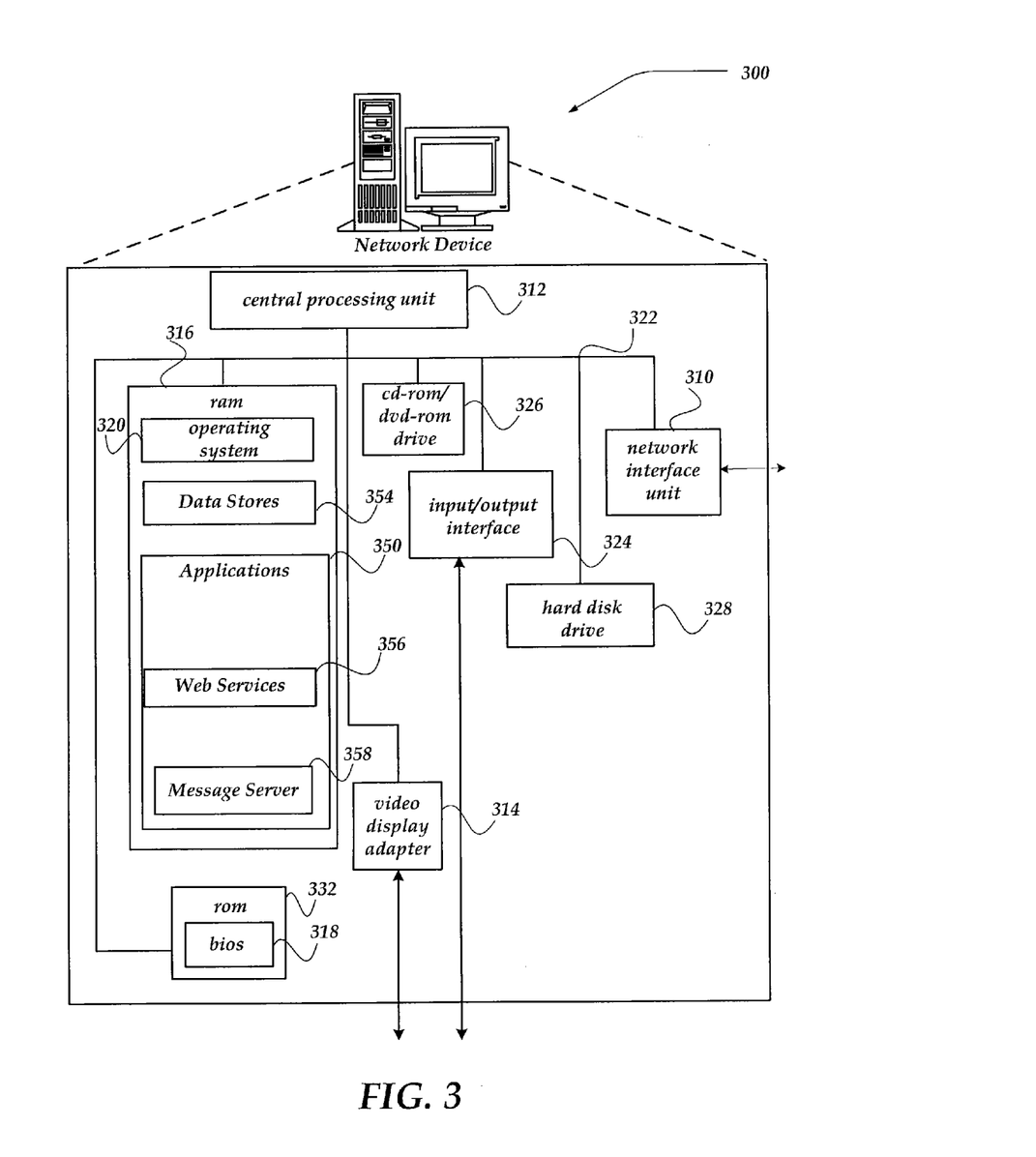
FIG. 3 shows a block diagram an embodiment of a network device of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, server device 108 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may include virtually any mechanism usable for store and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, and Message Server (MS) 358.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited, to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

Illustrative Processes

Figure 4:
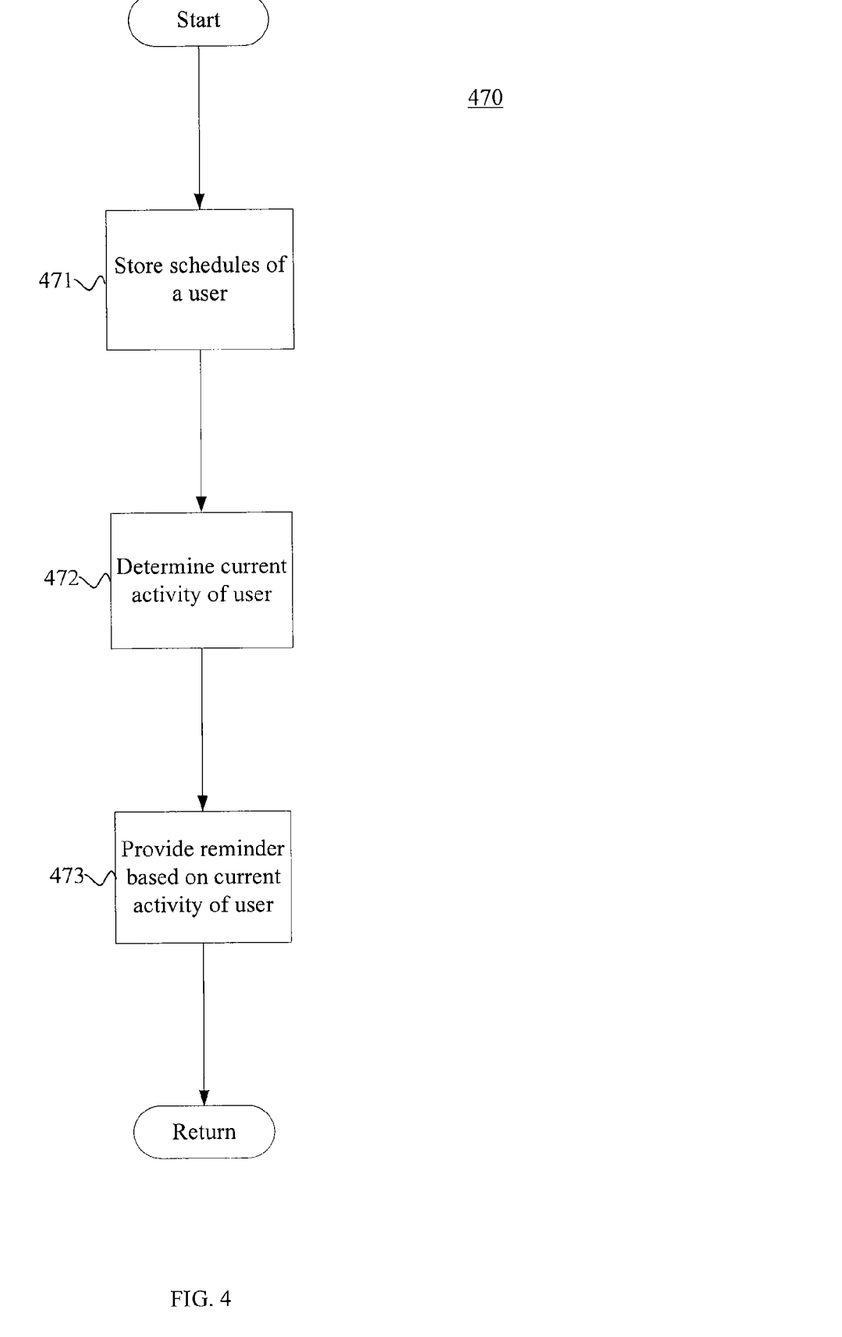
FIG. 4 illustrates a flow chart of an embodiment of a process of schedule management.

FIG. 4 illustrates a flow chart of an embodiment of a process (470) of schedule management. Process 470 may be performed by an embodiment of client device 200 of FIG. 2. After a start block, the process proceeds to block 471, where at least one schedule for a user is stored. The process then moves to block 472, where a current activity of the user is determined. The process then advances to block 473, at a remind time for one of the at least one stored schedule, a reminder is provided according to a reminder method. The reminder method is based on at least the determined current activity of the user. The reminder methods may include reminder methods such as voice, ring, vibration, light, and/or text. The process then proceeds to a return block, where other processing is resumed.

The determination of reminder method at block 473 may be based on one or more of the following factors. In some embodiments, a global positioning system (GPS) may be used to determine whether the used is still at the same location as previously, and a microphone may be used to determine whether the user is participating in a conversation or meeting. Based on both of these factors, in may be determined that the user is still in a meeting, in which case, a reminder method such as vibration that does not interfere with the meeting may be selected.

Additionally, the GPS may be used to determine the velocity of the user, which is one factor that may be used to determine whether the user is in a vehicle, and whether or not the user is driving. If the user is driving, the process may select voice via a speaker as the reminder method, due to hands free driving laws that exist in some jurisdiction.

Figure 5:
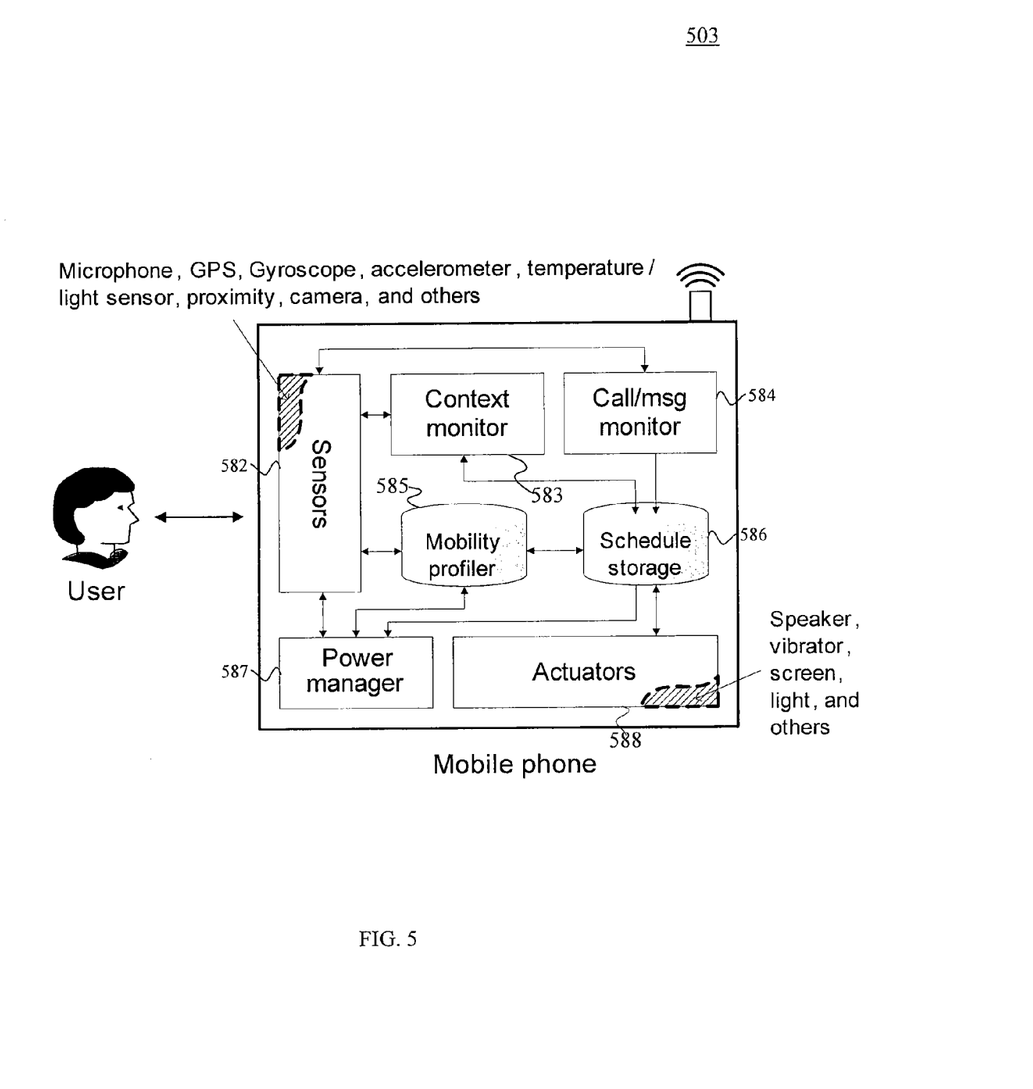
FIG. 5 shows a block diagram of an embodiment of the device of FIG. 2.

FIG. 5 shows a block diagram of an embodiment of smart mobile phone 503, which may be employed as an embodiment of client device 200 of FIG. 2.

In some embodiments, smart mobile phone 503 is a sensor-rich mobile phone that automatically creates, reminds, and reschedules a user's schedule in a way that the user can meet the schedule while avoiding trivial interactions with a schedule management system in a mobile phone. In these embodiments, smart mobile phone 503 locally monitors a user's call conversation(s) and/or message(s) that are related to his/her schedule and extracts/stores schedule information (via voice-recognition or keyword-based text extraction techniques). Furthermore, the smart mobile phone 503 adaptively monitors and maintains user's mobility patterns or navigation habits to improve the effectiveness of the management tasks.

In these embodiments, based on a user's stored schedule information, the smart mobile phone 503 periodically checks and reminds a user with correct right timing and with an appropriate reminder method. Smart mobile phone 503 estimates a user's expected arrival time to a meeting place, based on his/her current context as well as mobility patterns in real time. Here, smart mobile phone 503 takes into accounts various context information, including the user's current or destination location, transportation means (e.g., bus, car, train, or walk), a user's average moving speed via these means of transportation. Then, smart mobile phone 503 notifies this schedule to a user in a way that the user can arrive at the meeting place in time. In addition, smart mobile phone 503 dynamically determines its notification (or alert) methods (choosing among vibration, LED, voice, etc.) in a way that a user is not disrupted in his/her current context. For example, if a user is still in a conversation with an important customer at the previous meeting place, smart mobile phone 503 automatically detects such activities and uses vibration or light for the next meeting.

Additionally, in these embodiments, smart mobile phone 503 includes efficient and adaptive schedule adjustment techniques. If a user cannot make the next meeting schedule because of the prolonged current meeting or because of a user's driving speed or traffic conditions, the smart mobile phone 503 creates/sends a SMS message to the corresponding contact to inform the contact of the user's delay and/or situations, after confirming a user's intention through an appropriate method. In addition, if the corresponding person replies back to the user for canceling or rescheduling the meeting via call, email, SMS, or others, smart mobile phone 503 automatically switches to an appropriate notification mode (e.g., switch to a speaker phone to talk with the user for a call) or extracts schedule information from messages, and updates the user's schedule.

Smart mobile phone 503 includes sensors 582, context monitor 583, call and message monitor 584, mobility profiler 585, schedule storage 586, power manager management 587, and actuators 588.

Sensors 582 are employed to extract data that is used by context monitor 583 to determine the user's context and by mobility profile 585 to determine the user's mobility patterns. Sensors 582 may include microphone, GPS, gyroscope, accelerometer, temperature sensors, light sensors, proximity sensors, cameras, and/or the like.

Context monitor 583 employs data obtained from sensors 582 to determine a user's context or activity. Call and message monitor 584 is employed to extract schedule information of the user. Call and message monitor 584 extracts schedule information after the phone call or email or SMS message exchange. The schedule information extracted by call and message monitor 584 is stored in schedule storage 586. Schedule storage 586 stores and triggers schedule events Mobility profiler 585 employs data obtained from sensor 582 to determine the user's location and translates the sensed data into a mobility profile. Power manager 587 conserves energy used for schedule management. Power manager 587 determines how frequently to monitor user's activity and mobility pattern. Power manager 587 attempts to reduce energy usage of sensors 582 to conserve the energy in mobile device 503. Actuators 588 include various notification methods for schedules and the like. Schedule storage 586 actuates the appropriate actuator at the proper time, where the proper actuator is chosen based on various factors includes the context determined by context monitor 583. Actuators 588 may include speakers, a vibrator, a screen, light, and the like.

Figure 6:
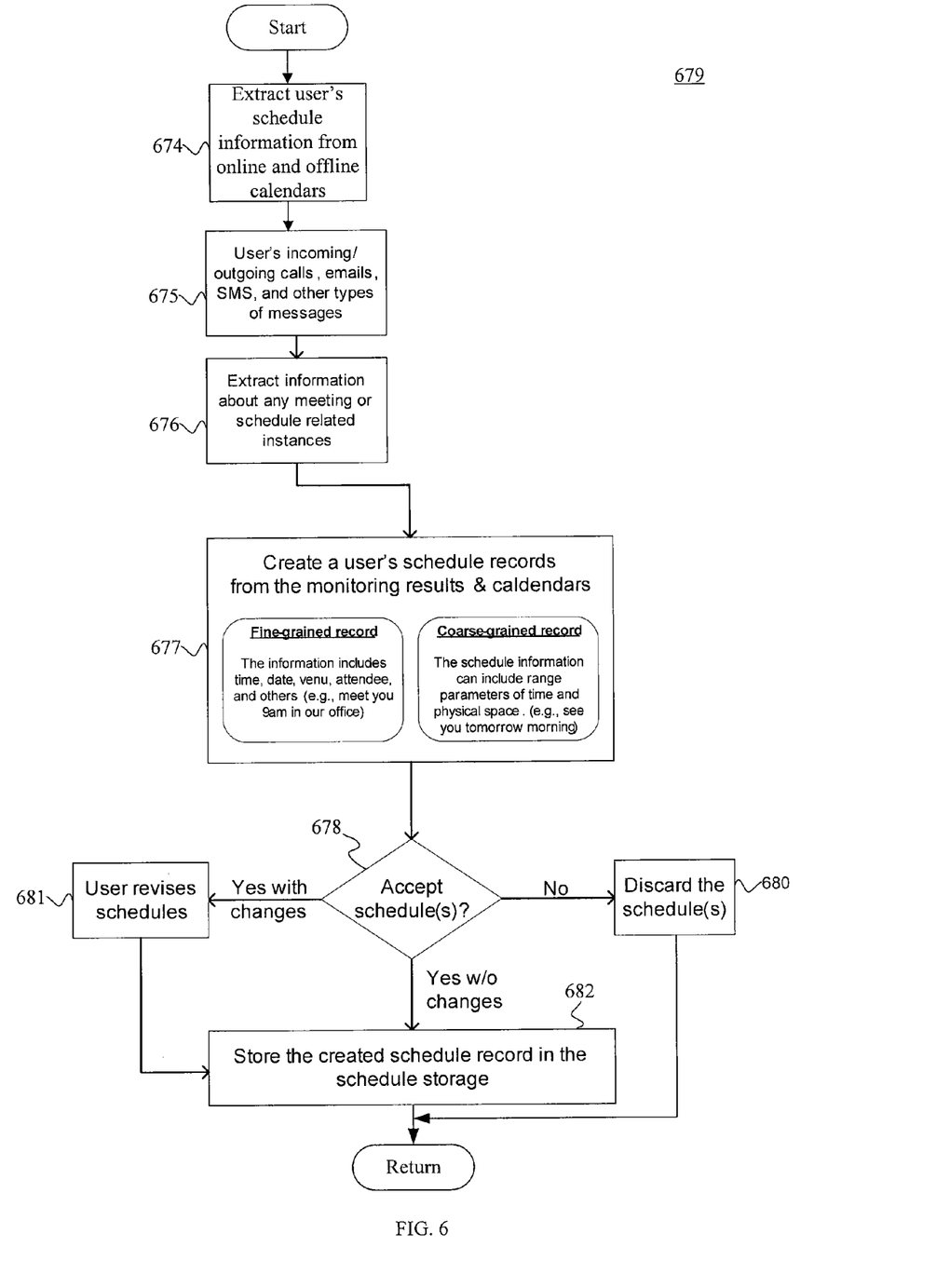
FIG. 6 illustrates a flow chart of an embodiment of a process of schedule creation.

FIG. 6 illustrates a flow chart of an embodiment of a process (679) of schedule creation that may be employed by smart mobile phone 503 of FIG. 5. After a start block, the process proceeds to block 674, where the user's schedule information, if any, is extracted from online and offline calendars. Online calendars could include, for example, Google calendar, a student course-scheduler, and/or the like. Off-line calendars may include an Outlook calendar, or the like. At step 674, schedules from such on-line and offline source are extracted and inserted into the user's stored schedule information in the user's smart mobile phone.

The process then moves to block 675, where the user's incoming and outgoing calls, emails, SMS, and other types of messages are received. The process then advances to block 676, where information about any meeting or schedule related instances are extracted from the call, email, SMS, or other message. If the message is a telephone call, or the like, it is first converted from voice to text. The extraction is accomplished by, inter alia, extracting key words that may related to creating a schedule. The message then proceed to block 677, where one of more schedules are created from the extracted information. There are two types of records that may be generated, fine-grained records and coarse-grained records.

The fine-grained records are created through keyword-based schedule extraction. For example, during the call, a mobile user might say "see you in our office at 3 pm tomorrow" or an email message might include keywords such as see you (at or in), meet you, 1 to 24, hours or AM or PM, or morning/afternoon/evening (after a number), tomorrow, (day of the week: Sunday, Monday, Tuesday, etc.). Then, the corresponding schedule is stored in the schedule storage of a mobile phone.

The first information extracted is words or phrases that may be indicative of establishing a meeting, such as "see", "meet", "call", or remind". Once such a word is found, the process looks in the proximity to this word for other words that may establish the action, time, participant, and place. Natural language processing is used to generate a schedule based on the words in the message.

The coarse-grained records are generated through heterogeneous schedule constraints: in some embodiments, the process allows for heterogeneous formats in a user's schedule information. Some extracted schedules might have detailed information, whereas some schedules might not (e.g., "I will call you tomorrow sometime afternoon"). In such case, the process stores schedules in a range format (e.g., 12 pm-5 pm) to handle such heterogeneity. Again, natural language processing is used to generate the heterogeneous schedules.

The process then moves to decision block 678, where a determination is made as to whether the user accepts the schedule. In some embodiments, the user may elect to accept the generated signal with no changes, to accept the schedule but with changes to the schedule, or to reject the schedule. If the user rejects the schedule, the process advances to block 680, where the schedule is discarded. The processing then proceeds to a return block, where other processing is resumed. If the user accepts the schedule with changes, then the process moves to block 681, where the user revises the schedule. The process then advances to block 682, where the created schedule record is stored in the schedule storage. The process then proceeds to the return block. If the user accepts the schedule with no changes, the process moves to block 682.

Figure 7:
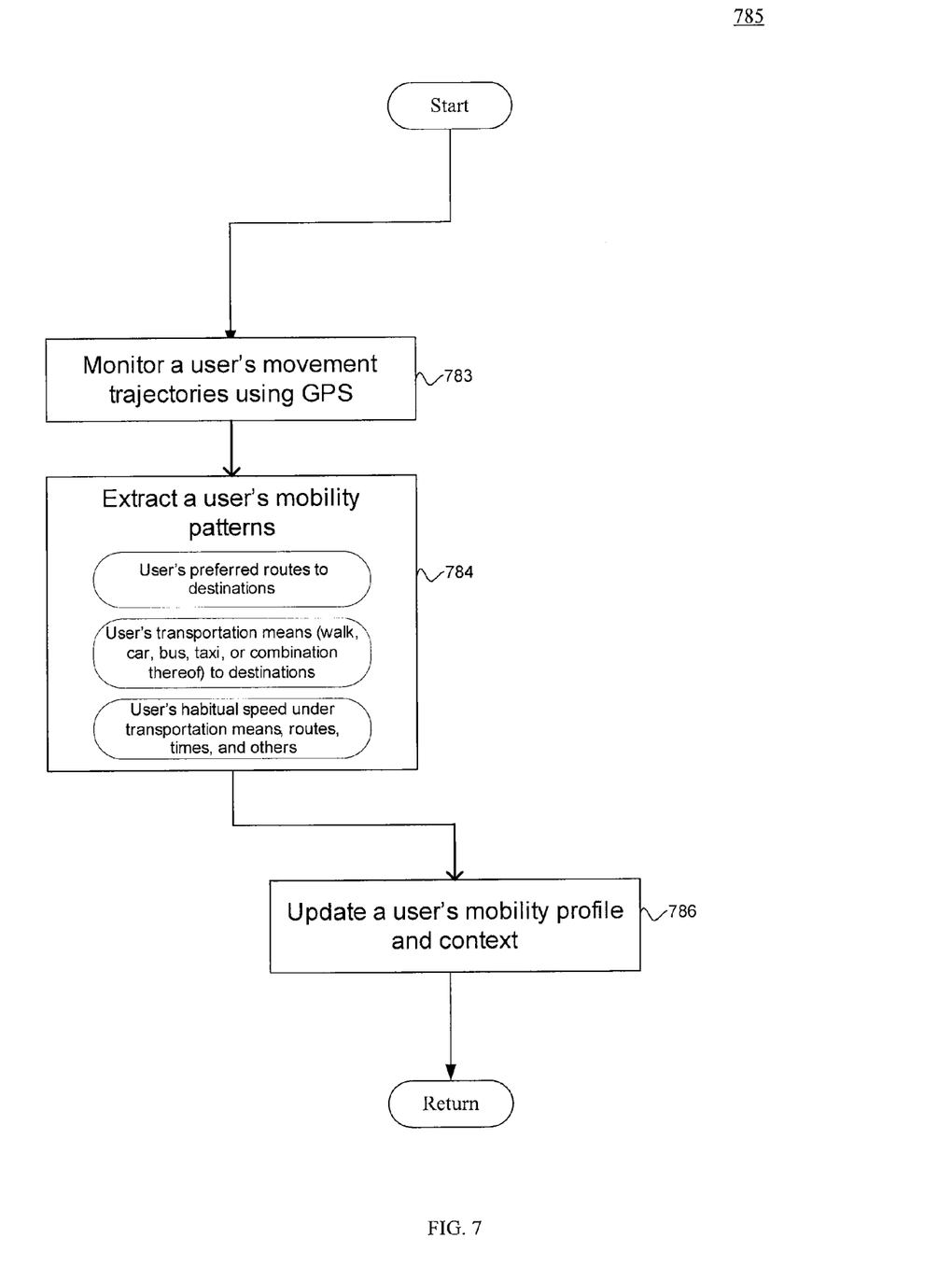
FIG. 7 shows a flow chart of an embodiment of a process of mobility profile monitoring.

FIG. 7 shows a flow chart of an embodiment of a process (785) for mobility profile monitoring, which may be employed by client device 503 of FIG. 5. After a start block, the process proceeds to block 783, where the user's movement is monitored using a global positioning system (GPS). In some embodiments, monitoring the user's movement happens by periodically polling the user's position. The process then moves to block 784, where the user's mobility patterns are extracted. A mobile phone, carried by a mobile user, periodically monitors user's mobility patterns. These patterns include a user's trajectory (e.g., route), his/her personal navigation attributes (average speed, preferred routes, driving habits, habitual speed under current transportation means, and others) and a current transportation mean (detected by a user's velocity and routes). The system adjusts a polling interval based on previous mobility profiles (e.g., every-day commute path) as well as an energy level of a mobile phone. If the mobile user is travelling in a new area, the system increases a polling rate to identify the user's mobility patterns. Here, the system makes use of location (map) information to adaptively adjust the polling rate. For example, if a user is driving in a highway, then the system might reduce a polling rate (to save an energy for operating GPS) and use an interpolation technique to estimate speed of a user in that area.

In some embodiments, the mobility pattern takes into account various factors such as time of the day, and day of the week (for example, whether or not the day is a weekend or holiday). The mobility pattern stores a user's preferred routes from one destination to another, and determines the user's average speed for each segment of the route, based on time of day and the day of the week.

The process then advances to block 786, where the user's mobility profile and context are updated. The process then proceeds to a return block, where other processing is resumed.

Figure 8:
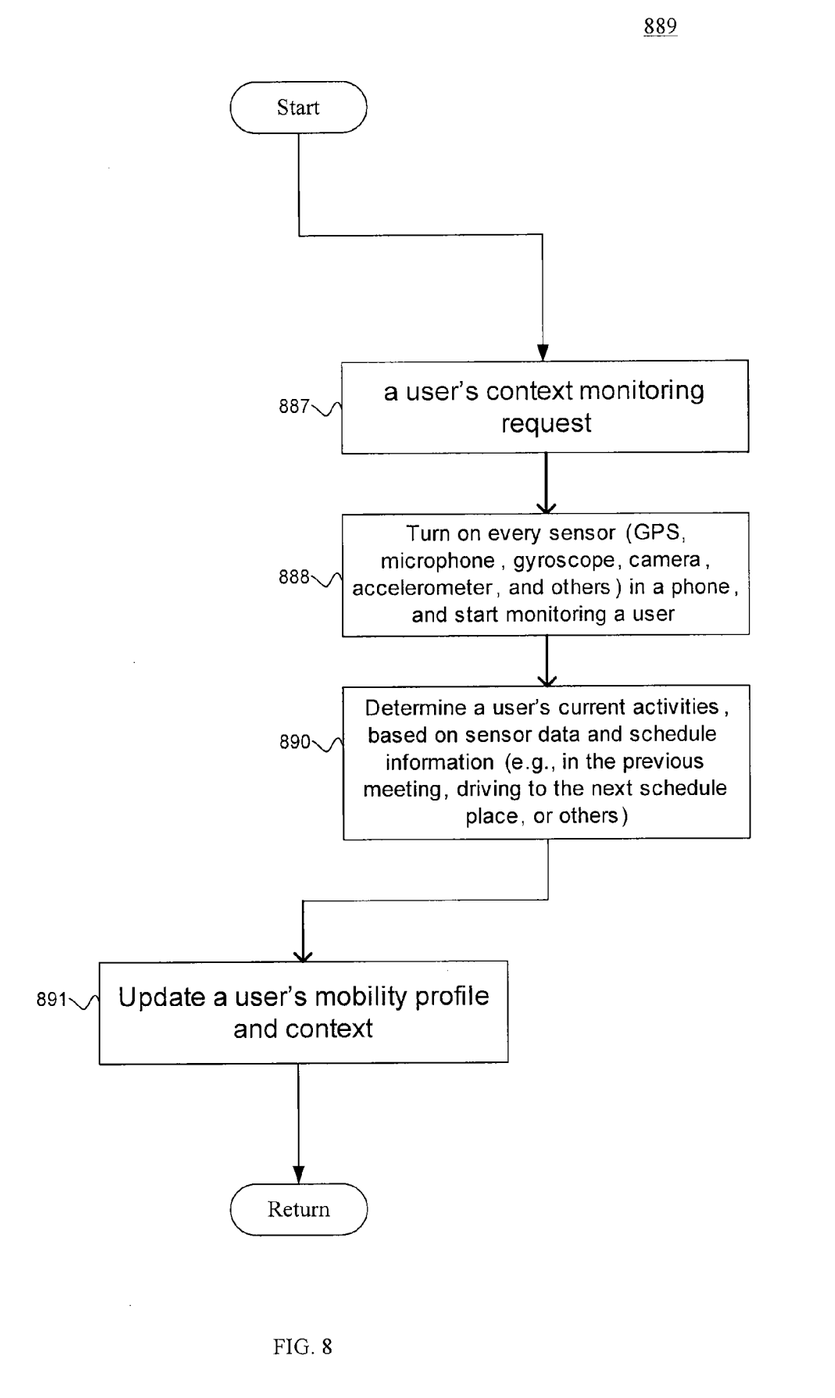
FIG. 8 illustrates a flow chart of an embodiment of a process of event-driven mobility and context monitoring.

FIG. 8 illustrates a flow chart of an embodiment of a process (889) of event-driven mobility and context monitoring, which may be performed by an embodiment of smart mobile device 503 of FIG. 5. After a start block, the process proceeds to block 887, where a user's context monitoring request is received. The process then moves to block 888, where every sensor (e.g., GPS, microphone, gyroscope, camera, accelerometer, and/or the like) is turned on, and begins monitoring the user. The process then advances to block 890, where the process identifies the user's current activities by jointly using a schedule, location, and other sensor information, such as a determining of whether the user in is a previous meeting, driving to the next schedule location, or the like). For example, if a mobile user's location is still in the previous meeting place (determined via GPS) and the user is talking with someone (detected via microphone), then the mobile device can determine that the user is busy on the previous meeting. In this example, the process determines whether the user is able to respond to a schedule-related message. For example, by using GPS and map information, the process can detect whether the user is driving or in traffic, and the process concludes that the user cannot read/write a mobile phone message (or call), say according to a "hands-free while driving" law, related to the user's next schedules. The "context" of the user and the "activities" of the user are used in the same way, and are used interchangeably throughout this document.

The process then proceeds to block 891, where the user's mobility profile and context are updated. The process then moves to a return block, where other processing is resumed.

Figure 9:
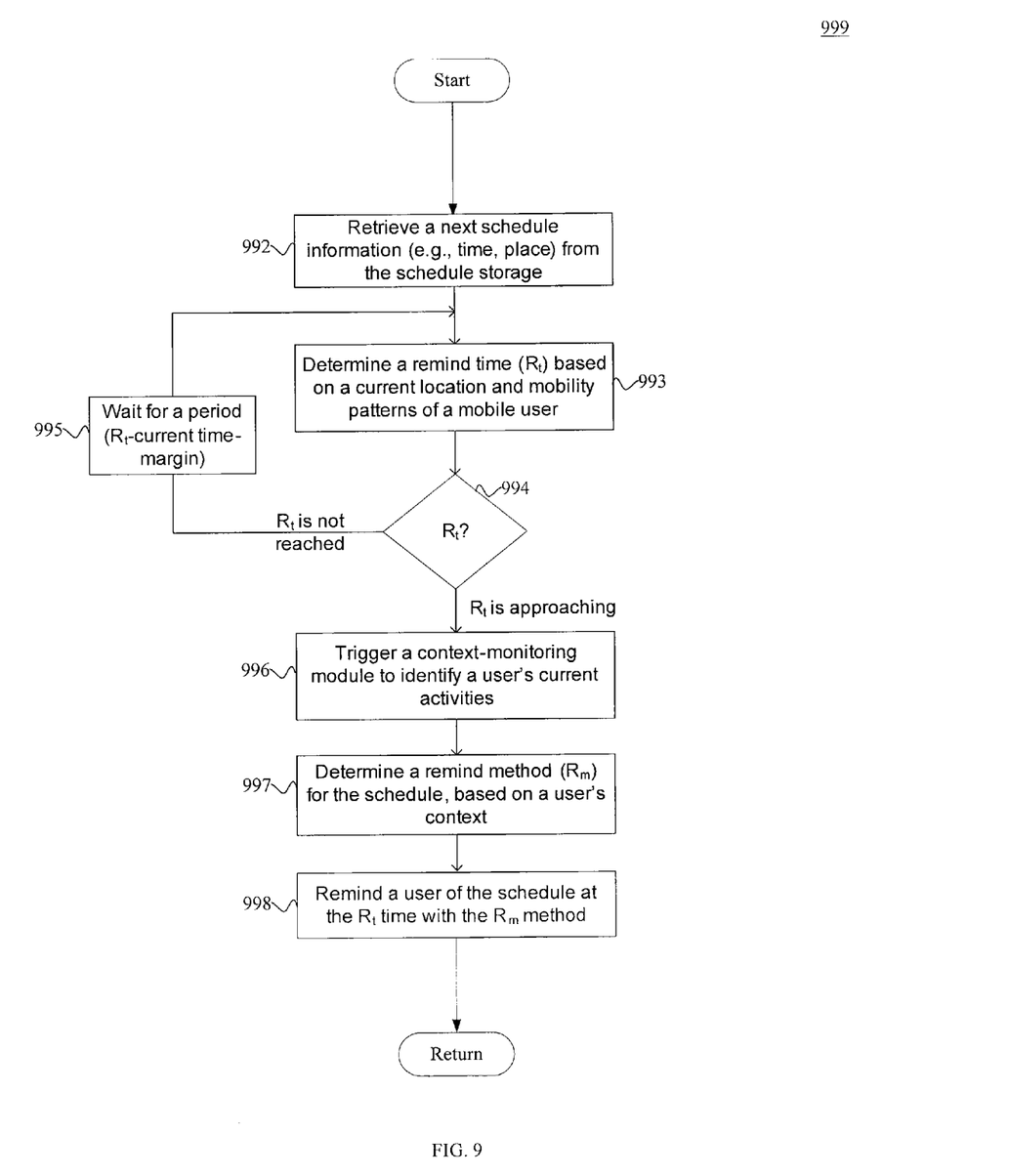
FIG. 9 shows a flow chart of an embodiment of a process for schedule reminding.

FIG. 9 shows a flow chart of an embodiment of a process (999) for schedule reminding that may be employed by an embodiment of smart mobile phone 503 of FIG. 5.

After a start block, the process proceeds to block 992, where the next schedule is retrieved from the schedule storage. The process then moves to block 993, where the remind time (Rt) is determined based on the current location of the user and the mobility patterns of the user. The process determines the time in a way that the user does not miss the next schedule time. To this end, the process consider the user's context information such as current location, distance to its transportation means, selection (or combination) of the transportation means, and average moving speed of each mode of transportation. The process may also use other information in the user's mobility profile, if available, such as the user's preferred route from the user's current location to the place of the meeting, as well as the average speed of the user along each part of the preferred route and this time of the day and at this day of the week. In some embodiments, average speed is used, so that Rt is set based on the average time it would take the user to get from his current location to the place of the meeting, but the user may set more conservative estimates if desired. For example, in some embodiments, the user can select the remind time to be based on average speed plus one or more standard deviations, as selected by the user.

The process then advances to decision block 994, where a determination is made as to whether the remind time, Rt, has been reached yet. If Rt has not yet been reached, the process proceeds to block 995, where the process continues to wait until time Rt has been reached. The process then proceeds to block 993. However, if the determination at decision block 994 is positive, the process moves to block 996, where a context-monitor module (e.g., context monitor 583 of FIG. 5) is triggered to identify the user's current activities.

The process then advances to block 997, where a remind method for the schedule is determined based on the user's context. At this block, the process reminds a user of a next schedule without disrupting a user's current activity, while ensuring the delivery of a reminder. Based on the user's current activity information (e.g., meeting, driving, lunch), a mobile device selects the most effective and non-disruptive reminder method among multiples (e.g., ring, vibration, light, speaker). For example, if the user is driving or in a noisy area, the process selects speaker phone in a voice format to remind a user's schedule. Or, if the user is in the conversation with a person then the process selects triggering vibration or light to avoid any disruption to the user's current activity.

The process then proceeds to block 998, where the user is reminded of the schedule at time Rt with the selected reminder method. The process then moves to a return block, where other processing is resumed.

Figure 10:
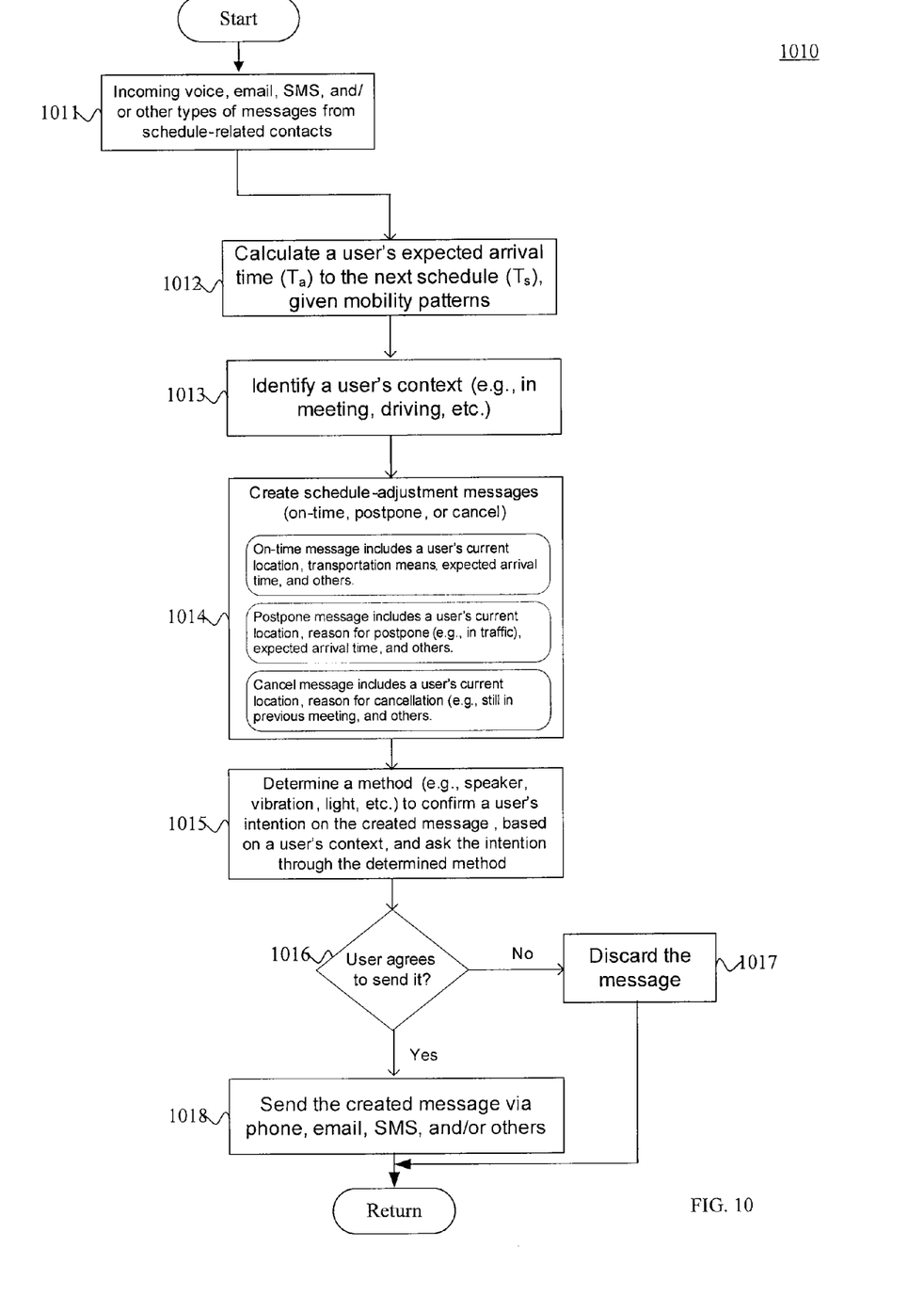
FIG. 10 illustrates a flow chart of an embodiment of a process for schedule adjustment, in accordance with aspects of the present invention.

FIG. 10 illustrates a flow chart of an embodiment of a process (1010) for schedule reminding that may be employed by an embodiment smart mobile phone 503 of FIG. 5.

After a start block, the process proceeds to block 1011, where incoming voice, email, SMS, and/or other types of messages are received from schedule-related contacts. The process then moves to block 1012, where the user's expected arrival time ($T_a$) to the next schedule ($T_s$) is calculated based on the user's mobility patterns. The process then advances to block 1013, where the user's context is identified. For example, the user's context may be that the user is in a meeting, driving, walking, eating lunch, or the like.

The process then proceeds to block 1014, where a schedule adjustment message is created based on the user's context, and expected arrival time $T_a$. In some embodiments, The message sent may include an on-time message, postpone message, or cancel. For example, as determined at block 1013, a mobile user might be in the middle of important meeting with key customers, which might run a longer time. Or, it may have been determined at block 1013 that a mobile user might be driving on a highway. If the system receives a call or a message from a person involved in the next schedule (at block 1011), then at block 1014, and it is determined at block 1012 that the user will not be on time, then the process may generate a postpone message saying that "the user is driving and will be arriving at 14:10". If at block 1012 it is determined that the user will be on time to the meeting, then at block 1014, the process generates an on-time message that includes the user's current location, transportation means, and expected arrival. If at block 1012 it is determined that the user will be late to the meeting, and the context determined at block 1013 indicates the user will attend the meeting, but will be late, then at block 1014, the process generates a postpone message that includes the user's current location, the reason for postponing (e.g., in traffic), expected arrival time, and the like. If the expected arrival time determined at block 1012 and context determined at block 1013 indicate that the user can not make the next schedule, for example due to a prolonged current meeting, the system generates a cancel message, which includes the user's current location, reason for cancellation (e.g., still in previous meeting), and the like.

The process then moves to block 1015, where a method (such as speaker, vibration, light, text, ring, or the like) is selected to confirm a user's intention on the message that was generated at block 1014. This determination is similar to the selection of a reminder method at block 997 of process 999 of FIG. 9. The method is selected based on the user's context, and confirmation of the user's intent is asked through the selected method.

The process then advances to decision block 1016, where a determination is made as to whether the user agrees to send the message. If so, the process proceeds to block 1018, where the created message is sent via phone, email, SMS, or the like. The process then moves to a return block, where other processing is resumed.

If the determination at decision block 1016 is negative, the process advances to block 1017, where the message is discarded. The process then proceeds to a return block, where other processing is resumed.

Additionally, instead of waiting for a message from a schedule participate to be received, the smart mobile device may instead determine whether the schedule needs to be adjusted based on whether the user is in a previous meeting, is going to be late for the next schedule, or the like, and may generate messages to each participant of the schedule accordingly. As with process 1010, the smart mobile device may prompt the user for verification as to whether the adjustment to the schedule should be made, and if so, adjust the schedule and send the generated messages to the schedule participants. If not, the changes to the schedule and the generated messages are discarded.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for schedule management, comprising:
monitoring, by a mobile device: at least one of a user's conversations and messages and extracting schedule information via at least one of voice-recognition and keyword-based text extraction; storing at least one scheduled event for the user based on the extracted schedule information; estimating a travel time to the at least one scheduled event for the user based on the user's current location, a location corresponding to the at last one scheduled event, and a means of transportation; determining a remind time based on the estimated travel time, wherein a difference between the remind time and a time corresponding to the at least one scheduled event is greater than or equal to the estimated travel time; at the remind time, providing a reminder to the user according to a reminder method, wherein the reminder method is selected from a plurality of reminder methods based on determination of a current context of the user;
determining that the user will be unable to arrive at the at least one scheduled event on time; and in response to determining that the user will be unable to arrive at the at least one scheduled event on time, sending a message to at least one participant of the scheduled event indicating that the user will be unable to arrive at the at least one scheduled event on time.

2. The method of claim 1, wherein the plurality of reminder methods include at least one of voice, ring, vibration, light, or text.

3. The method of claim 1, further comprising:
prompting the user for verification that the extracted schedule information is correct.

4. The method of claim 1, further comprising: categorizing extracted schedule information into course-grained schedule information and fine-grained schedule information; and generating a fine-grained record or a course-grained record corresponding to the at least one scheduled event based on the categorization.

5. The method of claim 1, further comprising: prior to storing the at least one scheduled event for the user based on the extracted schedule information, providing the user with an option to accept the at least one scheduled event or to reject the at least one scheduled event.

6. The method of claim 1, further comprising: providing the user with an option to modify the at least one scheduled event.

7. An article of manufacture including a non-transitory processor-readable medium having processor-executable code encoded therein, which when executed by one or more processors, enables actions for schedule management,
comprising: monitoring at least one of a user's conversations rand messages and extracting schedule information via at least one of voice-recognition and keyword-based text extraction; storing at least one scheduled event for the user based on the extracted schedule information; estimating a travel time to the at least one scheduled event for the user based on the user's current location, a location corresponding to the at least one scheduled event, and a means of transportation; determining a remind time based on the estimated travel time, wherein a difference between the remind time and a time corresponding to the at least one scheduled event is greater than or equal to the estimated travel time; and at the remind time, providing a reminder to the user according to a reminder method, wherein the reminder method is selected from a plurality of reminder methods based on determination of a current context of the user; determining that the user will be unable to arrive at the at least one scheduled event on time; and in response to determining that the user will be unable to arrive at the at least one scheduled event on time, sending a message to at least one participant of the scheduled event indicating that the user will be unable to arrive at the at least one scheduled event on time.

8. A device for schedule management, comprising: a memory that is arranged store processor executable code; and a processor that is arranged to execute the processor-executable code to enable actions, comprising: monitoring at least one era user's conversations and messages and extracting schedule information via at least one of voice-recognition and keyword-based text extraction; storing at least one scheduled event for the user based on the extracted schedule information; estimating a travel time to the at least one scheduled event for the user based on the user's current location, a location corresponding to the at least one scheduled event, and a means of transportation; determining a remind time based on the estimated travel time, wherein a difference between the remind time and a time corresponding to the at least one scheduled event is greater than or equal to the estimated travel time; and at the remind time, providing a reminder to the user according to a reminder method, wherein the reminder method is selected from a plurality of reminder methods based on determination of a current context of the user; determining that the user will be unable to arrive at the at least one scheduled event on time; and in response to determining that the user will be unable to arrive at the at least one scheduled event on time, sending a message to at least one participant of the scheduled event indicating that the user will be unable to arrive at the at least one scheduled event on time.

* * * * *